W. M. SOMERVELL.
BOLT NUT.
APPLICATION FILED APR. 6, 1915.

1,183,251.  Patented May 16, 1916.

WITNESSES:
O. Johnson
Frank Warren

INVENTOR
Woodruff M. Somervell
BY
C. S. Haskins
ATTORNEY

COLUMBIA PLANOGRAPH CO., WASHINGTON, D. C.

UNITED STATES PATENT OFFICE.

WOODRUFF M. SOMERVELL, OF SEATTLE, WASHINGTON.

BOLT-NUT.

1,183,251.  Specification of Letters Patent.  Patented May 16, 1916.

Application filed April 6, 1915. Serial No. 19,445.

*To all whom it may concern:*

Be it known that I, WOODRUFF M. SOMERVELL, a citizen of the United States, residing at Seattle, in the county of King and State of Washington, have invented a certain new and useful Improvement in Bolt-Nuts, of which the following is a specification.

My invention relates to improvements in nuts for bolts, and the object of my improvements is to provide a nut that shall be adapted by its form to be screwed on to the screw-threaded portion of the shank of a bolt to a desired position and there be locked against a backward turning movement notwithstanding vibrations, shocks and concussions to which such bolt may be subjected under normal conditions of use by slightly distorting, bruising or displacing the apex of the screw-thread of the shank of such bolt at one or more circumferential points adjacent to certain projecting parts of said nut. The nut is removed by turning backward from such locked position, by force exerted through a wrench, to restore, smooth and reform such distorted, bruised or displaced portions of the bolt's screw-thread without destroying the screw-thread of said nut or affecting the further usefulness of the bolt and nut A, and a further object is to make such nut integral with all its parts and of such form as will adapt it to be forged and threaded at no greater cost than that of common forms of nuts for like employment. I attain these objects by devices illustrated in the accompanying drawings wherein—

Figure 1:
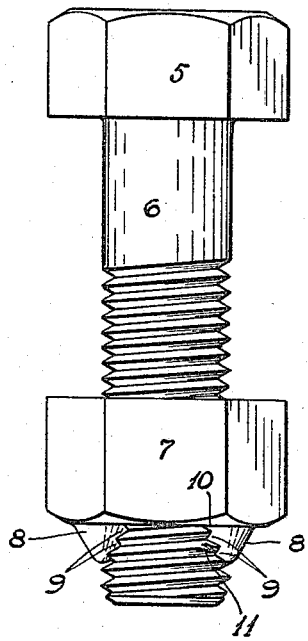
Figure 2:
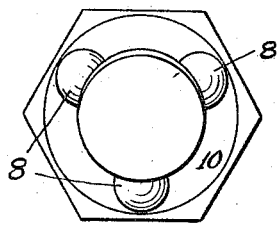

Figure 1 is a view in side elevation of a bolt upon which is disposed a nut embodying my invention; Fig. 2 is an end view of the shank of said bolt with the same nut disposed thereon, whereby is shown a plan view of the outer face of said nut, and Fig. 3 is a fragmentary view in side elevation of the shank of a bolt upon which is disposed one nut, like the nut of Fig. 1, together with another nut of a slightly modified form which may serve as a check nut more securely to lock the first named nut in its fixed position on the said shank, both of which nuts in Fig. 3 are shown in vertical mid-section.

Referring to the drawings, throughout which like reference numerals indicate like parts, 5 is the head of a bolt upon whose screw-threaded shank 6 is disposed a hexagonal nut 7, the inner faces of which bolt head 5 and hexagonal nut 7 may engage with the surfaces of the objects (not shown) which are to be bolted together. The hexagonal nut 7 is provided with a plurality of pointed prongs 8 which are integral therewith and which project from the outer face 10 thereof at equi-distant points adjacent to the edge of its screw threaded hole, being widely spaced apart, and the inner side surface of each of said prongs 8 is provided with screw-threads 9 which are incidentally formed when in the operation of manufacture the screw-thread of said nut 7 is formed by a screw cutting tap, whereby said screw-threads 9 may engage with the screw-threads of the shank 6 of the bolt, as more clearly shown in Fig. 1. In the operation of locking said nut 7 in its position on the screw-threaded shank 6 of a bolt, with its inner face against an object to be bolted, a chisel or set punch is employed to bend or jam a portion of the top of one or more of the convolutions of the screw-thread of the shank 6 immediately adjacent to the edge of one or more of the prongs 8 thereby to form projecting detents, like the detent 11 of Fig. 1, which detents by their engagement with the edges of the respective ones of the prongs 8 serve to prevent the nut 7 from turning backward on the shank 6 in response to or in consequence of any shocks, vibrations or concussions to which the bolt may be subjected under normal conditions of use. When, however, it is desired to unscrew the nut 7 from its locked position, as shown in Fig. 1, then a wrench is employed to turn the nut 7 backward with sufficient force to cause the prongs 8 to shave off or bend back said detents 11 thereby to smooth the screw-thread of the shank 6 thus permitting a continued rotation of such nut 7 in a direction to unscrew it without mutilating or injuring the screw-thread within the main body of such nut 7.

Figure 3:
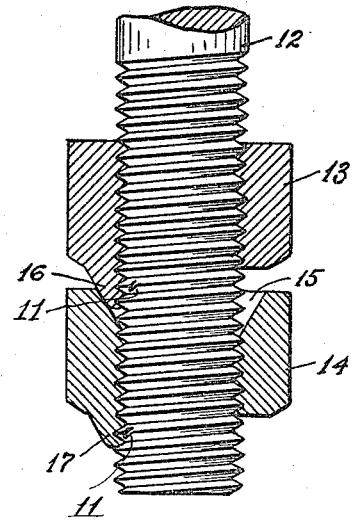

In Fig. 3, 12 is a fragment of the shank of a bolt upon which is disposed a nut 13, corresponding in form and function to the nut 7 of Fig. 1, which nut 13 may be locked in the manner indicated in Fig. 1, and in order to add to the security of the position of said nut 13 I have provided another nut 14 which in form is precisely like the nut 13, except that the edge of its screw-threaded hole adjacent to the nut 13 is beveled to form an annular recess 15 within which may project the prongs 16 of the nut 13; thus, after the nut 13 is turned against an object to clamp such object, and detents, like detent 11, have been formed on the screw-thread of the shank 12 thereby to lock such nut 13 in its position to clamp an object, then the nut 14 is screwed on to the shank 12 forcibly to engage the bevel surface of the annular recess 15 with the outer sides of the several prongs 16, thus in a cam-like manner to force such prongs 16 inwardly against the shank 12 more securely to lock the nut 13 in its position, and when the nut 14 is so screwed against the prongs 16 of the nut 13, then the screw-thread of the shank 12 may be provided with detents, like the detent 11, at points adjacent to the edges of the prongs 17 of said nut 14, in the manner described, thus to lock said nut 14 in its position more securely to lock the nut 13 in its position against the object to be bolted.

The nut 14 need be employed only as an additional security against a failure of the locking devices associated with the nut 13 when a bolt is to be subjected to abnormal conditions of use since under ordinary conditions a nut, like the nut 7, may be effectively locked and maintained in its required position.

Obviously changes may be made in the form and dimensions of the parts of my invention within the scope of the claim without departing from the spirit thereof.

What I claim is:

The combination with the screw-threaded shank of a bolt, of a screw-threaded nut mounted on the shank and provided with a series of spaced substantially frusto-conical lugs arranged within the periphery of the outer face of the nut and projecting therefrom parallel to the axis of the nut, the sides of the lugs adjacent the bolt being threaded to engage the threads on the bolt shank, the threads on the shank being deformed to form locking detents adjacent the sides of the lugs, and a second nut screwed on the bolt and provided on its under side with a frusto-conical recess engaging the outer sides of the lugs to force them inward and prevent their springing past said detents.

In witness whereof I hereunto subscribe my name this twenty-sixth day of March, A. D. 1915.

WOODRUFF M. SOMERVELL.

Witnesses:
A. HASKINS,
E. A. SWIFT.

Copies of this patent may be obtained for five cents each, by addressing the "Commissioner of Patents, Washington, D. C."